Figure 1:
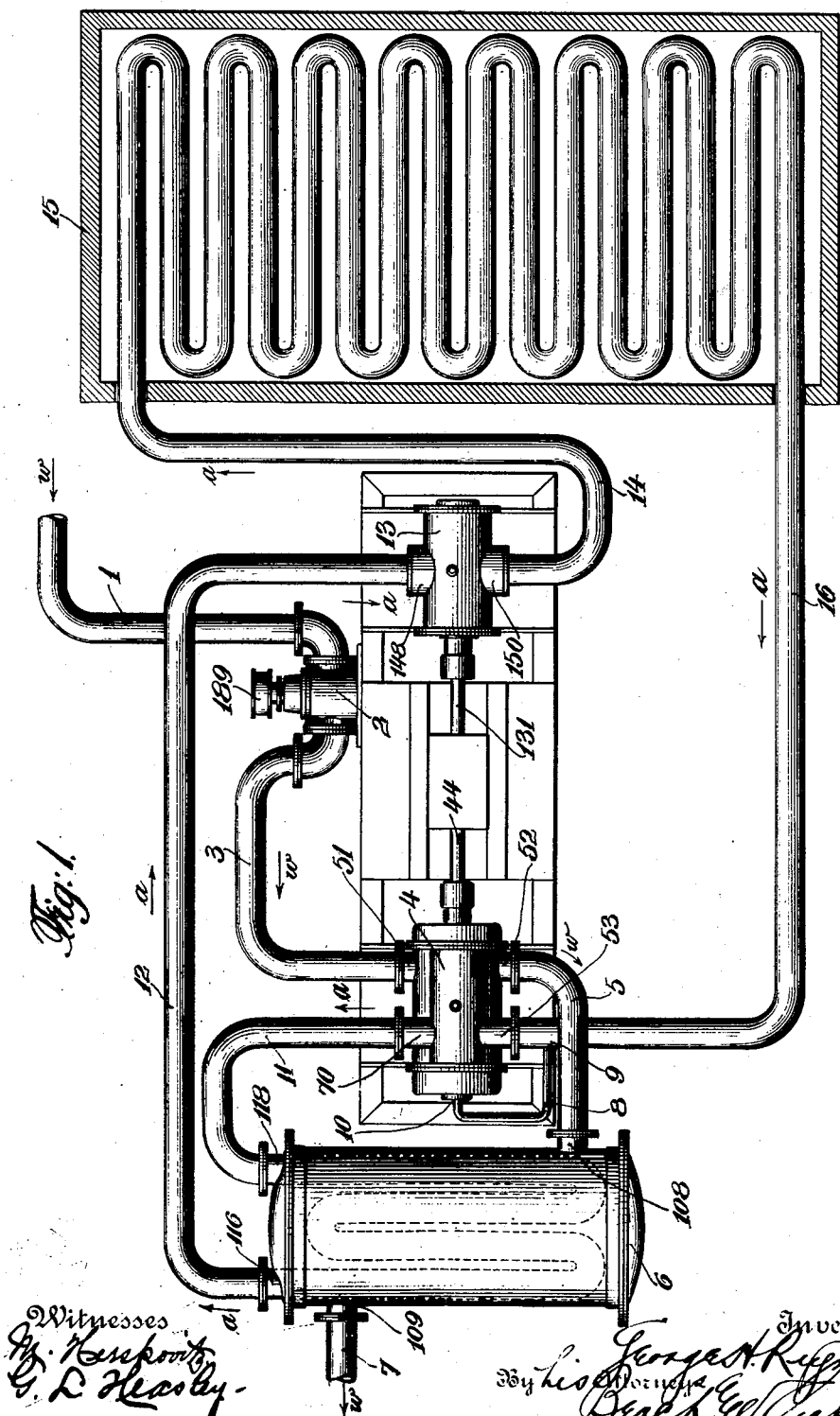

G. H. REYNOLDS.
ICE MAKING MACHINE.
APPLICATION FILED OCT. 31, 1906.

977,475.

Patented Dec. 6, 1910.
15 SHEETS—SHEET 1.

G. H. REYNOLDS.
ICE MAKING MACHINE.
APPLICATION FILED OCT. 31, 1906.

977,475.

Patented Dec. 6, 1910.
15 SHEETS—SHEET 4.

Witnesses
Inventor:

G. H. REYNOLDS.
ICE MAKING MACHINE.
APPLICATION FILED OCT. 31, 1906.

977,475.

Patented Dec. 6, 1910.
15 SHEETS—SHEET 5.

Witnesses
Inventor:

G. H. REYNOLDS.
ICE MAKING MACHINE.
APPLICATION FILED OCT. 31, 1906.

977,475.

Patented Dec. 6, 1910.
15 SHEETS—SHEET 7.

Witnesses
Inventor:
George H. Reynolds

G. H. REYNOLDS.
ICE MAKING MACHINE.
APPLICATION FILED OCT. 31, 1906.

977,475.

Patented Dec. 6, 1910.
15 SHEETS—SHEET 9.

Witnesses　　　　　　　　　Inventor:
　　　　　　　　　　　　　George H. Reynolds

G. H. REYNOLDS.
ICE MAKING MACHINE.
APPLICATION FILED OCT. 31, 1906.
977,475.
Patented Dec. 6, 1910.
15 SHEETS—SHEET 10.
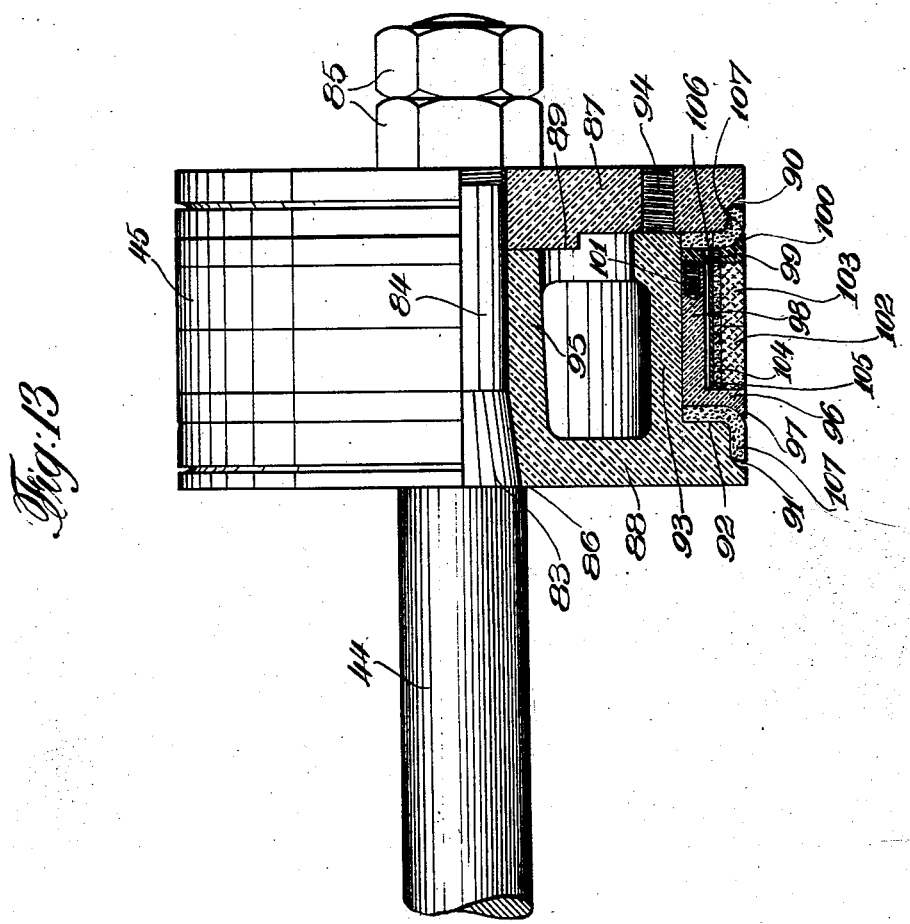

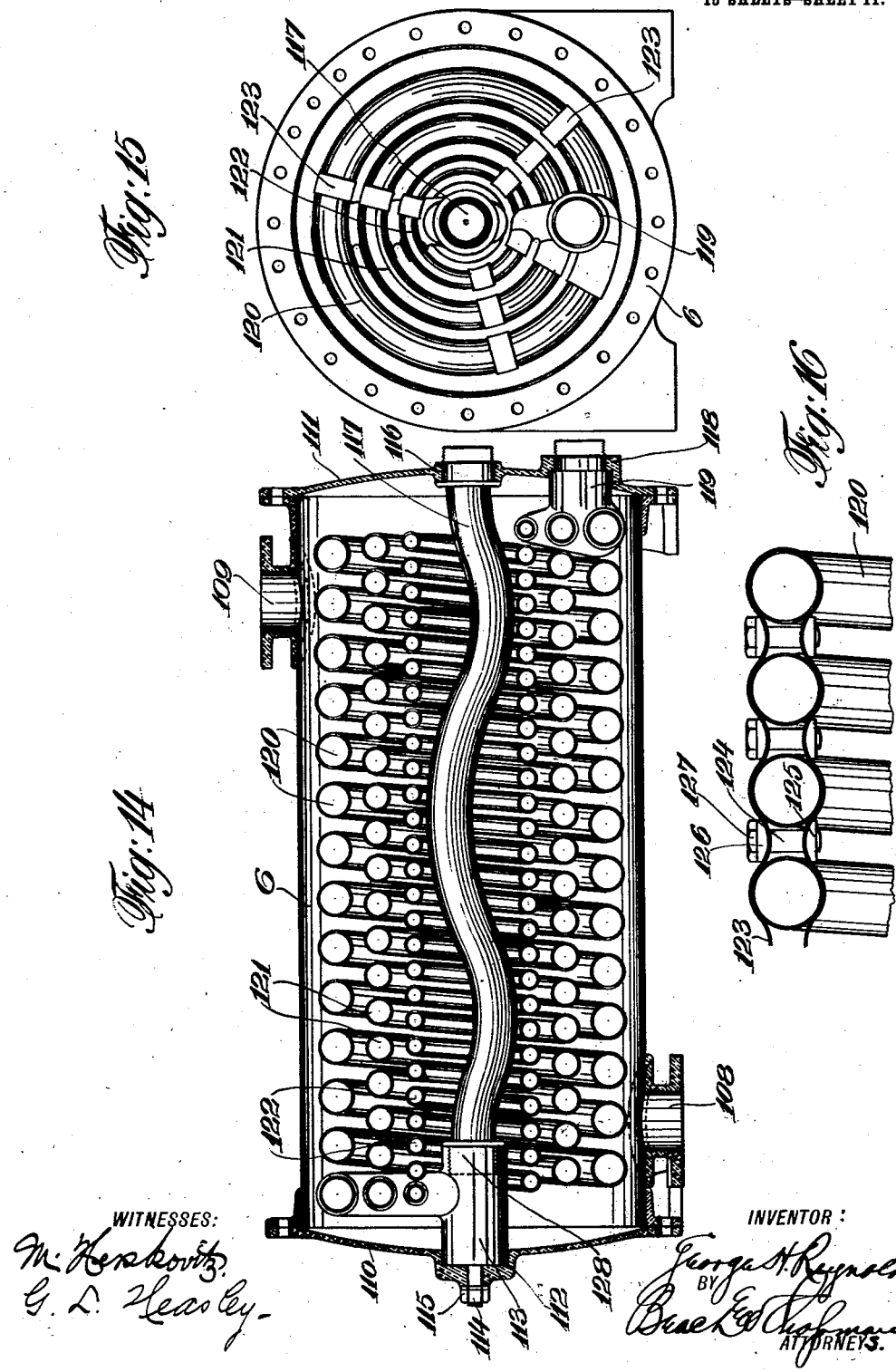

G. H. REYNOLDS.
ICE MAKING MACHINE.
APPLICATION FILED OCT. 31, 1906.
977,475.
Patented Dec. 6, 1910.
15 SHEETS—SHEET 12.
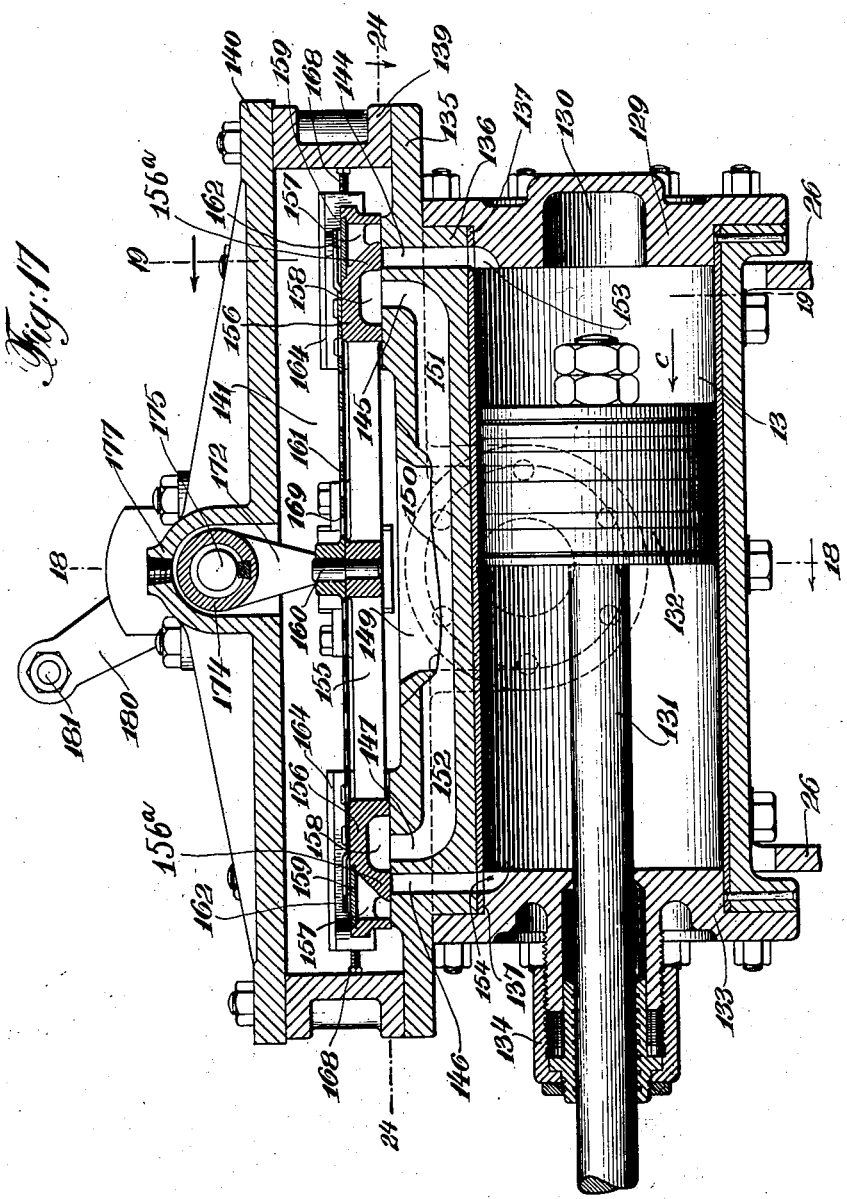

G. H. REYNOLDS.
ICE MAKING MACHINE.
APPLICATION FILED OCT. 31, 1906.

977,475.

Patented Dec. 6, 1910.
15 SHEETS—SHEET 13.

Witnesses

Inventor:
George H. Reynolds
By his Attorneys

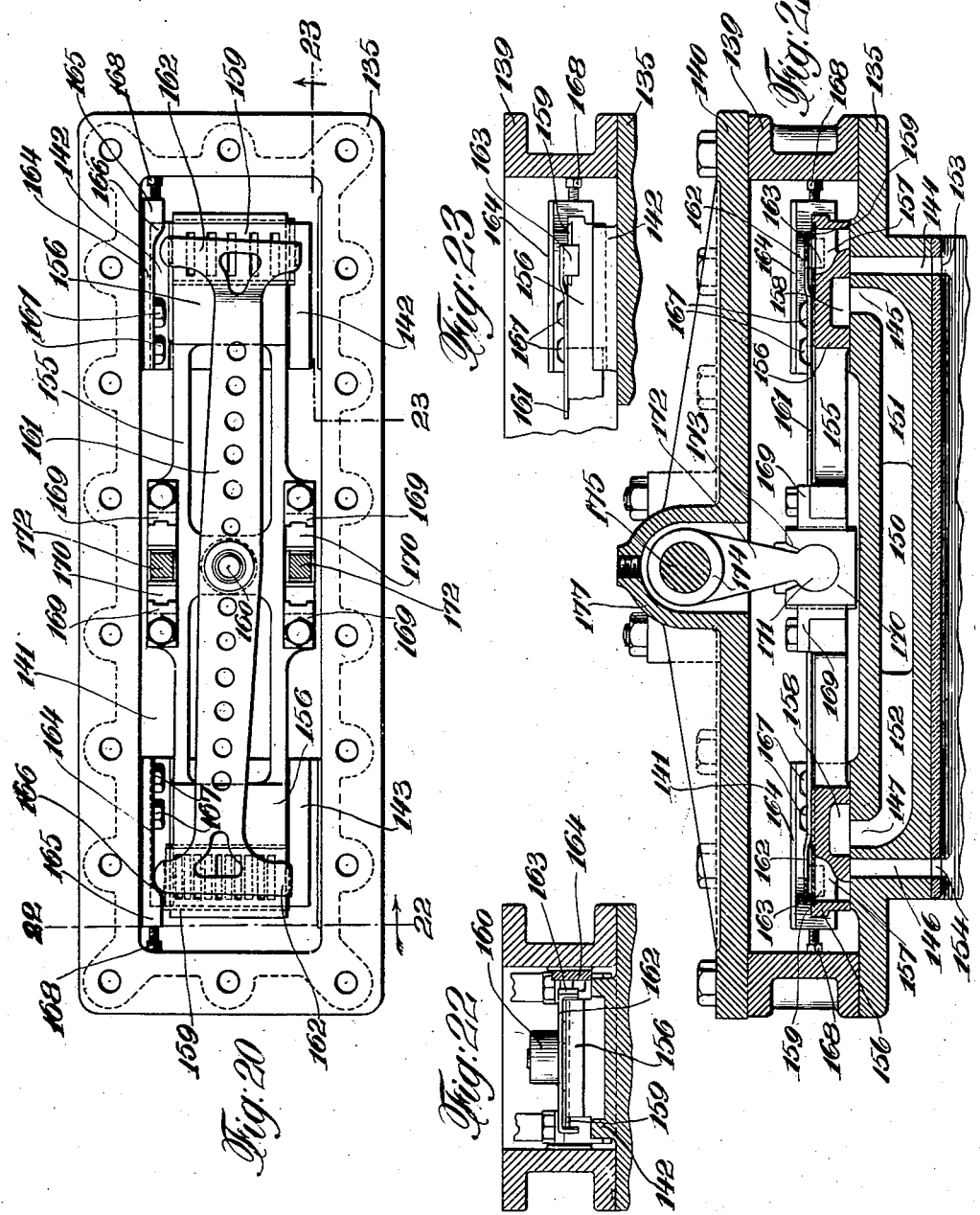

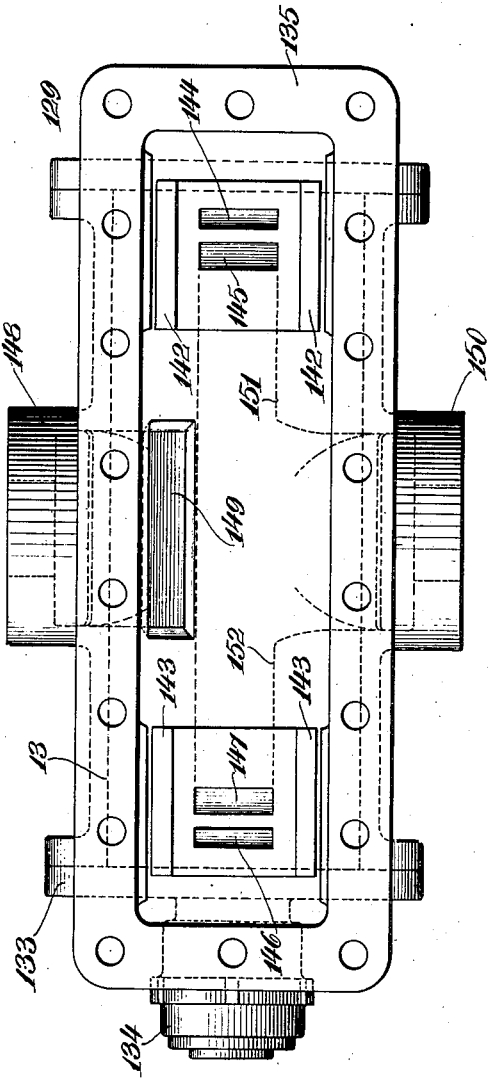

UNITED STATES PATENT OFFICE.

GEORGE H. REYNOLDS, OF MANSFIELD DEPOT, CONNECTICUT, ASSIGNOR TO THE REYNOLDS ICE MACHINE COMPANY, OF NEW YORK, N. Y., A CORPORATION OF NEW YORK.

ICE-MAKING MACHINE.

977,475.  Specification of Letters Patent.  Patented Dec. 6, 1910.

Application filed October 31, 1906. Serial No. 341,391.

*To all whom it may concern:*

Be it known that I, GEORGE H. REYNOLDS, a citizen of the United States, residing in Mansfield Depot, county of Tolland, and State of Connecticut, have invented a new and useful Improvement in Ice-Making Machines, of which the following is a description.

This invention relates to ice-making and refrigerating apparatus of the general type in which atmospheric air, or other gas, is first compressed, then cooled to abstract the heat due to the work of compression, then expanded, and then recompressed to be used over again by and in the apparatus.

Particularly, the invention relates to certain details of construction to be presently described which tend to improve and perfect the machines of the general character referred to.

Among the objects of my invention may be noted the following: to provide a complete, simple and compact apparatus for use in places where both the floor space and head space are small and where it is a desideratum to economize space on account of local requirements, such for example as on shipboard, in apartment houses, small refrigerating plants, etc.; to provide an apparatus of the character stated in which the driving mechanism is combined with the refrigerating machine so as to transmit the driving power to the power-shaft of the apparatus directly and economically and practically without loss in transmission; to provide an electrically driven refrigerating apparatus in which the driving-motor is disposed on the top of the machine so as to be out of the way of dirt, oil, water or other matter usually liable to injure or destroy its efficiency, thus enabling said motor to be installed without the usual objectionable shields, guard-covering, or casings; to provide an apparatus of the character stated in which the main supporting-frame carries within its outline all the essential mechanisms, thus producing a compact and well balanced structure without waste of floor space or head room and devoid of vibration; to provide certain details of construction relating to the compression mechanism, the cooling mechanism, and the expanding mechanism whereby the same are simplified, strengthened and made more effective in operation; to provide a new combination of the essentials of a refrigerating apparatus which increases efficiency and capacity; and to provide certain other improvements in details of construction which will be hereinafter more particularly described and claimed.

With the above objects in view, and others which will be disclosed during the course of the description, the invention consists in the parts, features, apparatus and combinations of elements and mechanisms hereinafter described and claimed.

Figure 2:
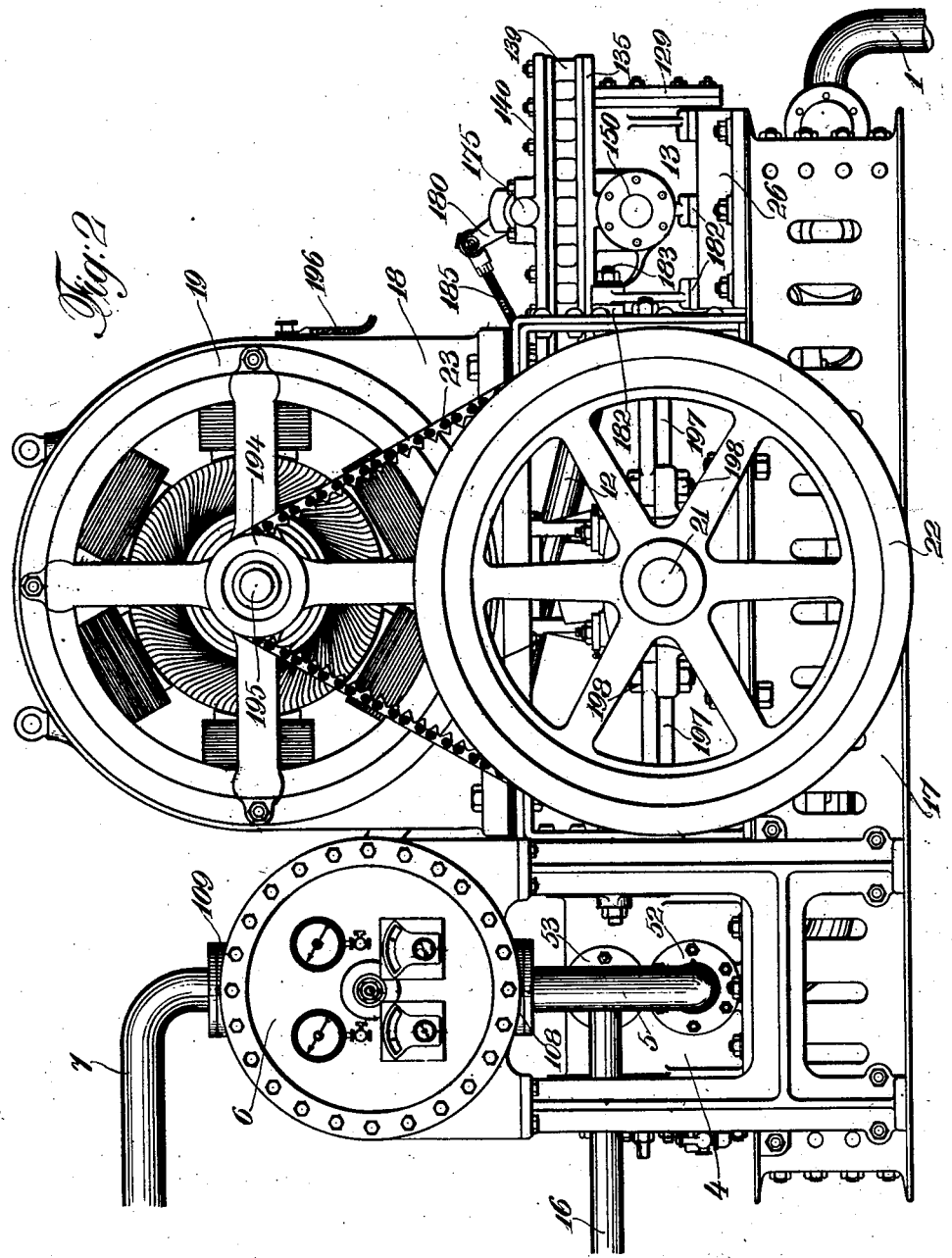
Figure 3:
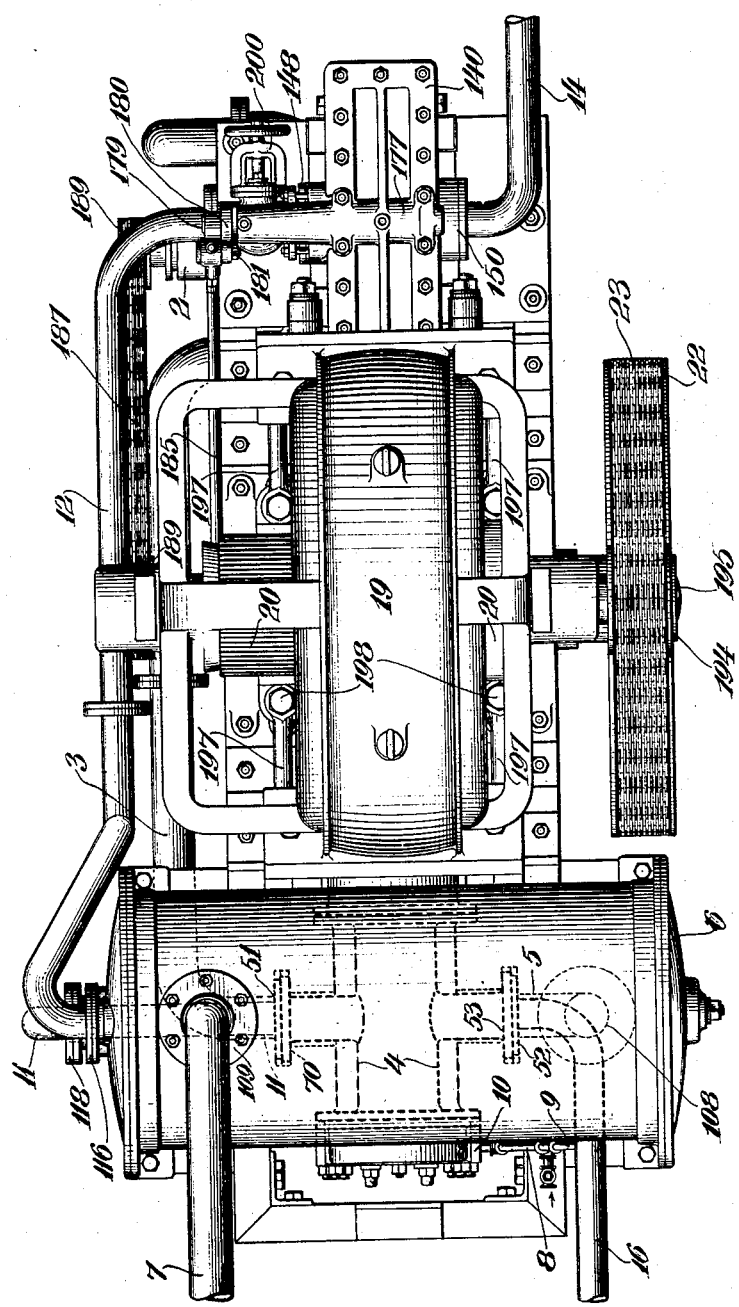
Figure 4:
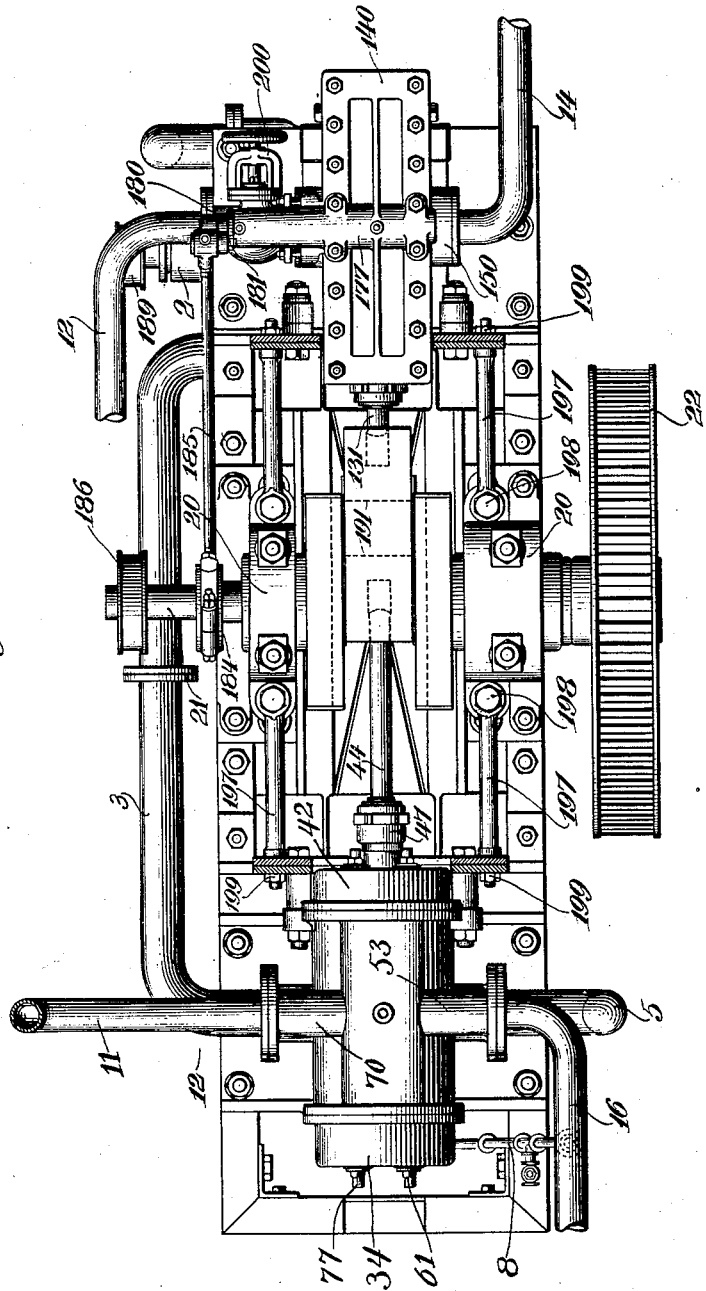
Figure 5:
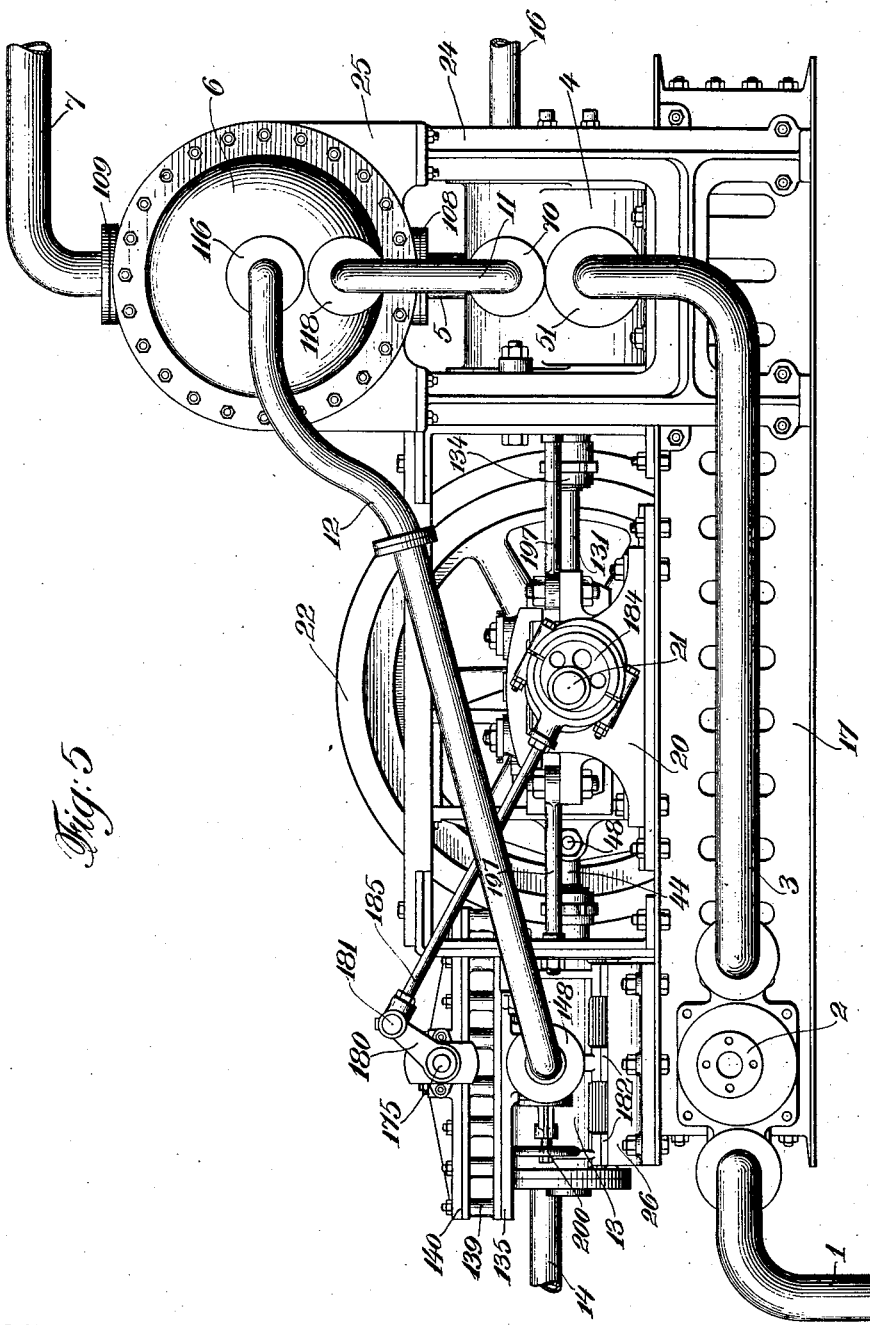
Figure 6:
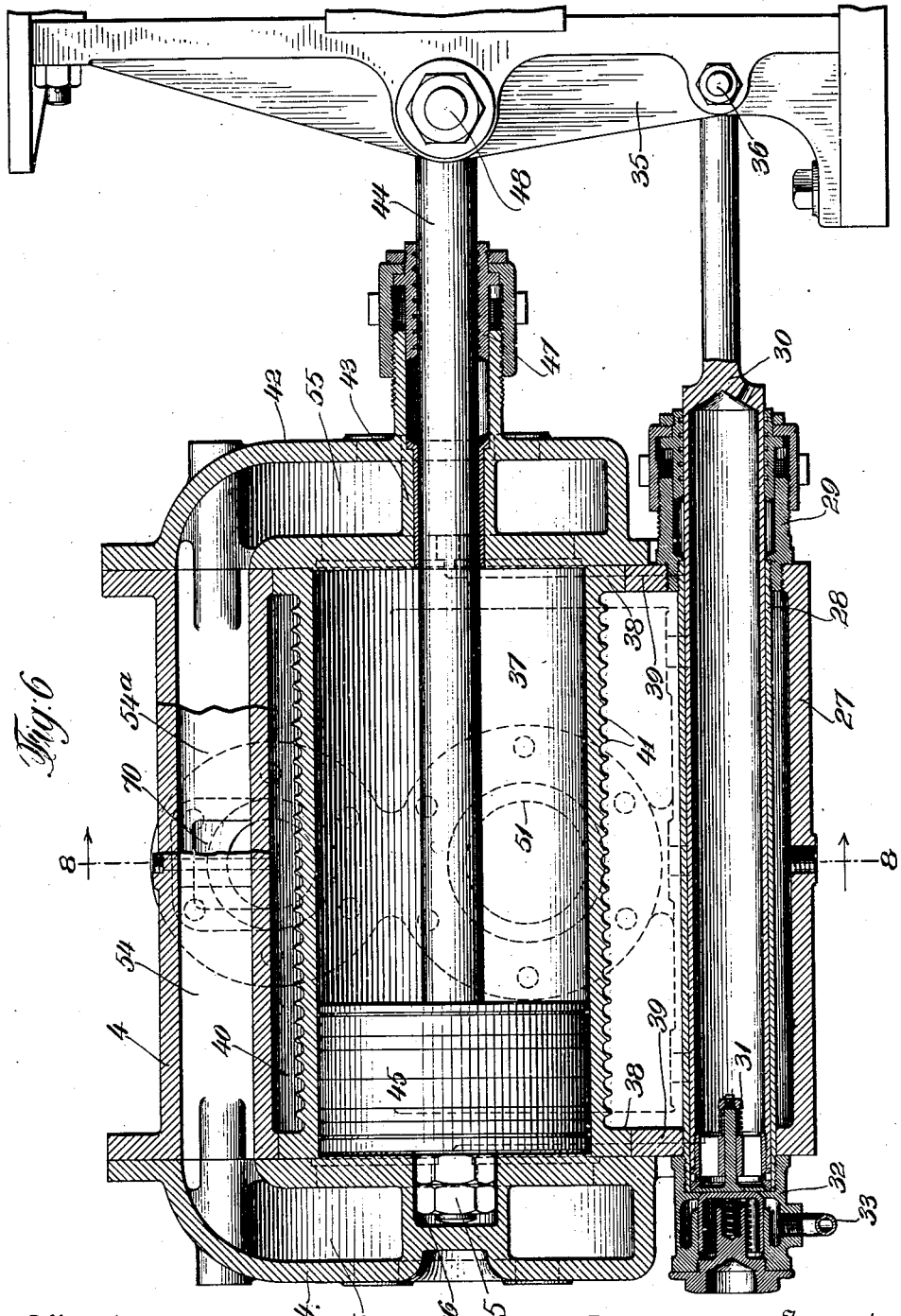
Figure 7:
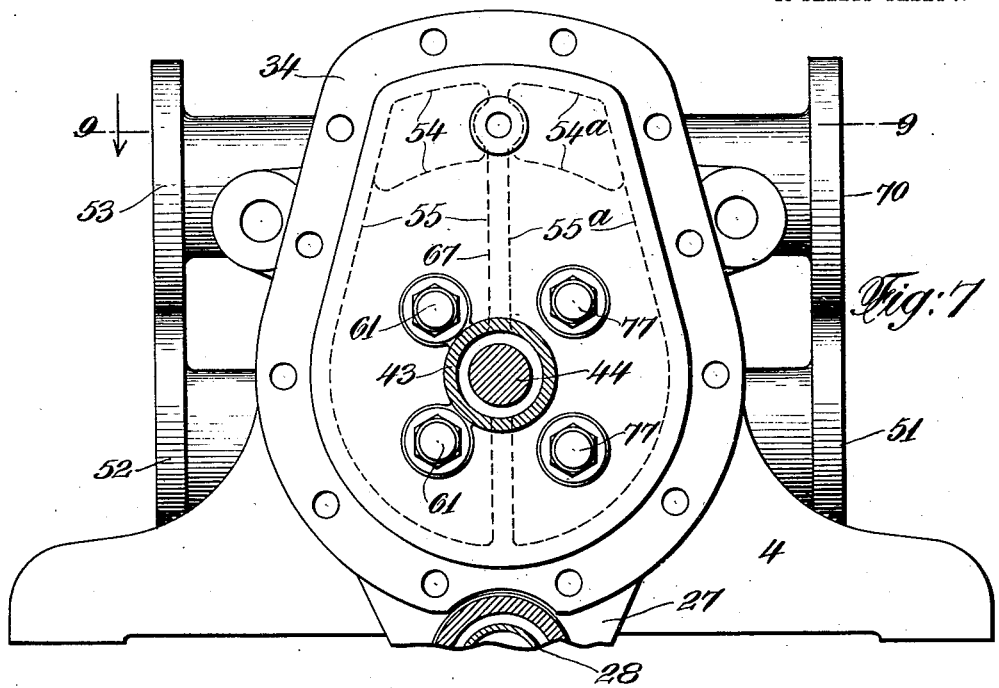
Figure 8:
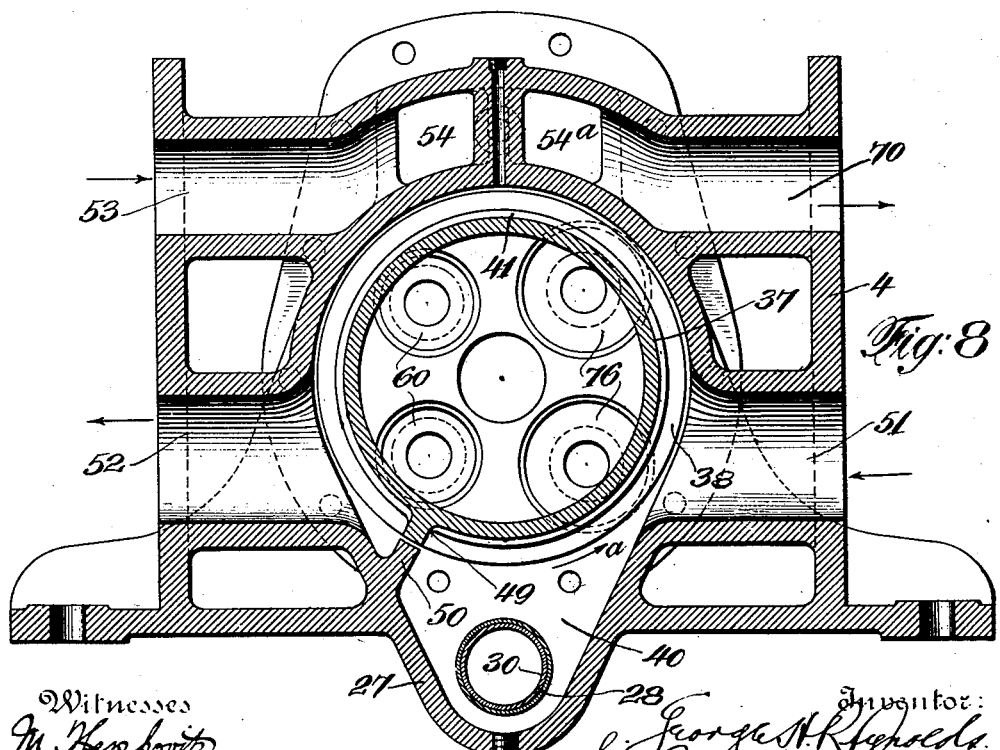
Figure 9:
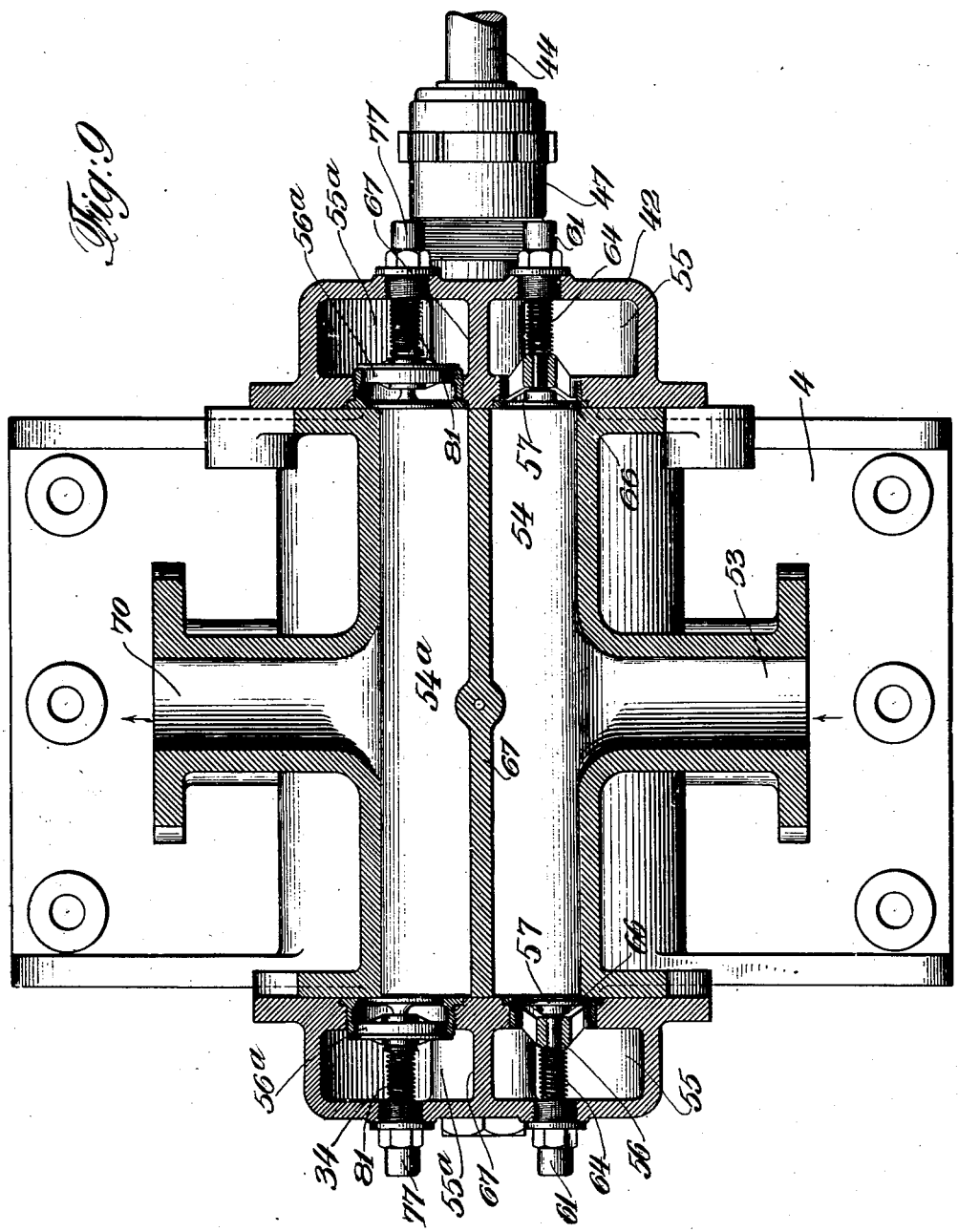
Figure 10:
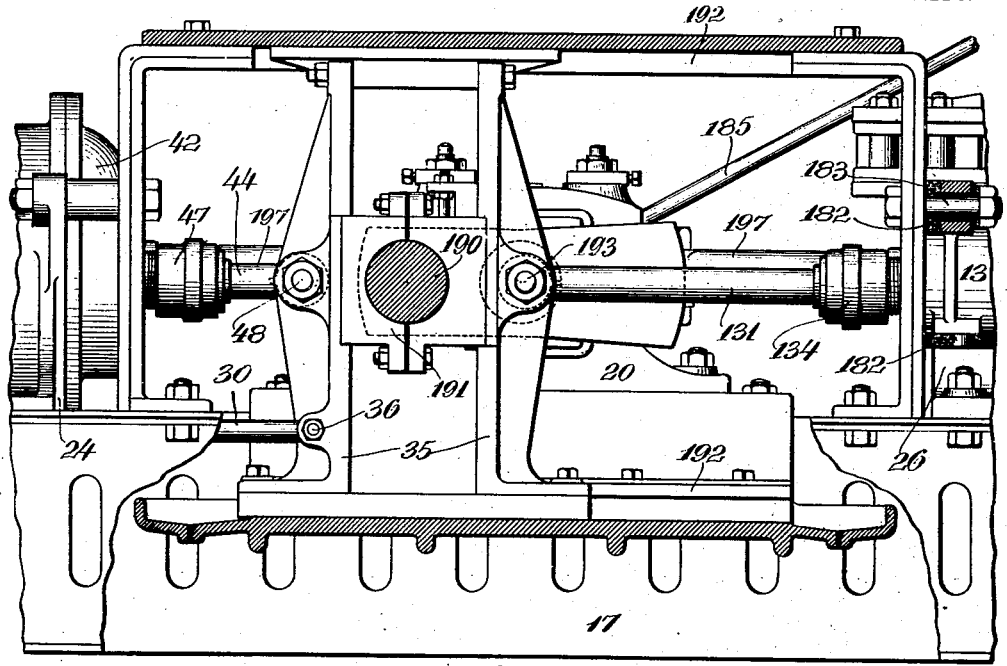
Figures 11, 12:
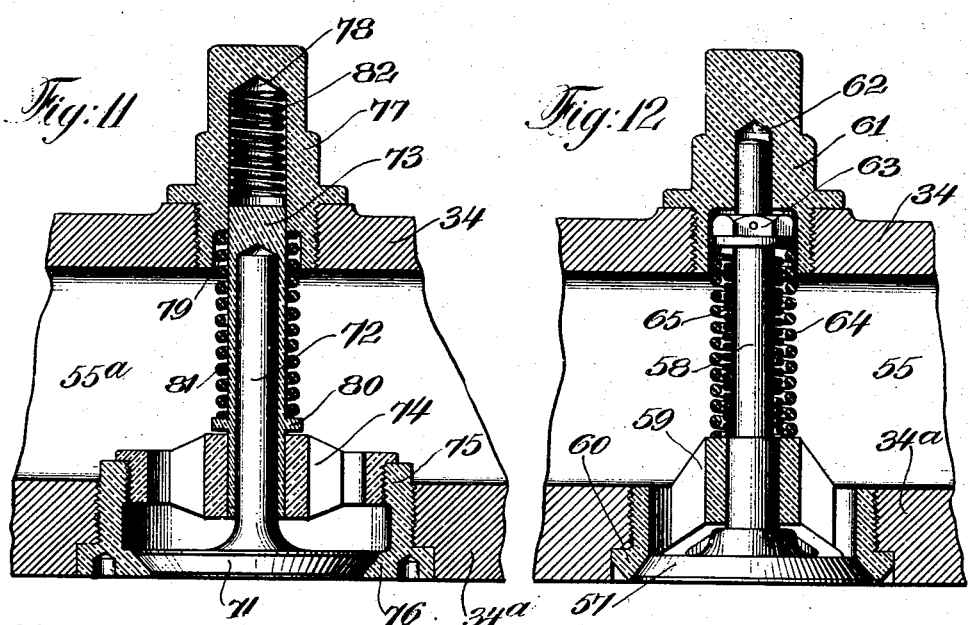
Figure 18:
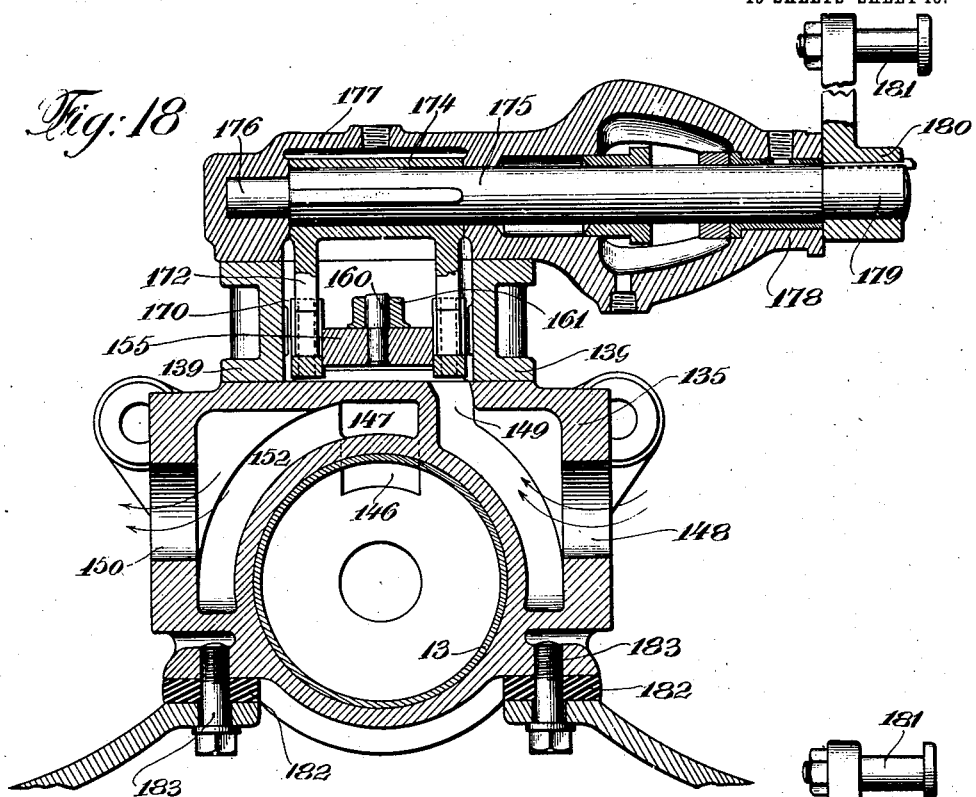
Figure 19:
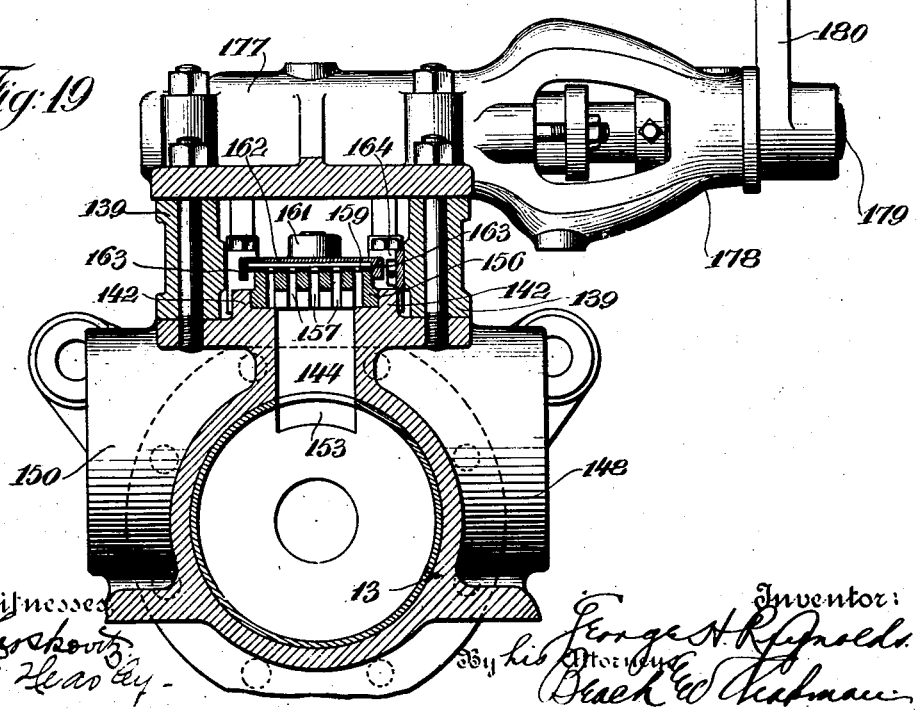

In order to clearly disclose the several features of the invention, the accompanying drawings are made a part of the specification, and therein:

Figure 1 represents, diagrammatically, all the essentials of the apparatus constituting my ice-making or refrigerating machine; Fig. 2 shows a side elevation of so much of the apparatus as is deemed necessary to illustrate the disposition and general arrangement of the parts constituting my invention; Fig. 3 is a top-plan view of the apparatus shown in Fig. 1; Fig. 4 is a top-plan view of the apparatus, with the motor removed; Fig. 5 is a side elevation of the apparatus opposite to that shown in Fig. 2; Fig. 6 is a longitudinal, vertical section of the compression cylinder and the primer pump, showing the pistons and a portion of the driving means for the latter, the location, only, of the valves in the ends of the compression cylinder being shown in dotted line, in order to avoid confusion of parts; Fig. 7 is an end elevation of the compression cylinder, a portion of the primer-pump cylinder being shown in section; Fig. 8 is a vertical cross-section of the compression cylinder substantially on the line 8—8 of Fig. 6, the arrow showing the directions of sight and the piston being removed; Fig. 9 is a longitudinal section of the compression cylinder substantially on the line 9—9 of Fig. 7, the figure also showing the end chambers of the compression cylinder in section, in order to illustrate the valve construction and disposition; Fig. 10 is a vertical longitudinal section of the central portion of the apparatus, showing the position of the driving-shaft and crank and the connection of the latter with the piston driving frame; Fig. 11 is an enlarged sectional detail of one of the outlet-valves of the compression chamber; Fig. 12 is a similar view of one of the inlet-valves of the compression chamber; Fig. 13 is an enlarged view showing, partially in elevation and partially in section, the piston-head and its rod used in both the compression cylinder and in the expansion cylinder; Fig. 14 is a vertical, longitudinal section of the cooling cylinder; Fig. 15 is an elevation of the inlet end of the cooling cylinder the head being removed; Fig. 16 is a sectional detail illustrating the manner in which the coils of the cooling cylinder are combined or coupled; Fig. 17 is a longitudinal, vertical section of the expansion cylinder and its coöperating valve-structure; Fig. 18 is a transverse vertical section of the expansion cylinder and valve construction taken substantially on the line 18—18 of Fig. 17, the piston being removed; Fig. 19 is a transverse vertical section of the expansion cylinder and valve construction taken substantially on the line 19—19 of Fig. 17; Fig. 20 is a top-plan view of the frame and a portion of the valve mechanism of Fig. 17; Fig. 21 is a longitudinal, vertical section of a portion of the valve mechanism shown in Fig. 17, the section being taken along the line calculated to disclose the details of the connection between the rock-shaft and the reciprocating frame of the valve; Fig. 22 is a section substantially on the line 22—22 of Fig. 20; Fig. 23 is a section substantially on the line 23—23 of Fig. 20; and Fig. 24 is a top-plan view of the valve construction of Fig. 17, substantially on the line 24—24 of Fig. 17.

The principles of operation of apparatus of the character made the subject of my invention being well understood by those skilled in the art, the accompanying drawings have not been burdened with details illustrating the many and various parts constituting a complete apparatus for refrigerating purposes; but, the illustrations have been confined to just so much of the refrigerating apparatus as has been deemed important or necessary to illustrate the manner in which I contemplate carrying my invention, in all its details, into effect. It may be well, however, to state generally, with reference to the diagram of Fig. 1, that water is employed as a cooling medium for the gas and is conveyed to the apparatus by connection with any suitable water-main, plug or spigot, through the water-inlet pipe 1, the pump 2 being employed for causing the proper circulation of the water through the apparatus, the water, after leaving the pump, being driven through the pipe-connection 3 to the compressor 4 and from the latter through the pipe 5 to the cooling-tank 6 and from the latter through the pipe 7 to the sewer or any suitable drain. As will be presently disclosed, the compression cylinder or tank has combined therewith a primer-pump mechanism which, in the diagram of Fig. 1, is illustrated only by the small pipe-connection 8 tapped into the return-pipe of the air-circulating system at the point indicated by 9, the other end of said primer-pump being tapped into the compression cylinder at 10, in order to illustrate that the compression cylinder may be primarily supplied with air and thereafter constantly supplied with air, in order to keep up the volume of gas or other circulating medium. The air or gas on leaving the compression tank passes through the pipe or conduit 11 into the cooling tank 6 and through the coils of pipe therein, passing therefrom through the conduit 12 to the expansion cylinder 13, thence passing through the conduit 14 to the "cold" room or other place or point of refrigeration indicated in the diagram at 15. After accomplishing its work in the cold room, the air or gas passes through the return conduit 16 to the compression cylinder, where it is again compressed and compelled to reperform its work. With this general statement of the character of the apparatus, and its principle or mode of operation, the several details of my invention will be readily understood from the following detail description.

*General arrangement.*—Viewing Figs. 2, 3, 4 and 5, the juxtaposition of the several parts, the relation of the same as contemplated by my invention and the manner in which the several mechanisms are combined in order to form a simple and compact refrigerating apparatus will be seen and understood; and, particularly, referring to these figures, the main frame is indicated by 17 and centrally supports the framing 18, upon which is mounted a motor 19. The main frame 17 also supports the pillow-blocks or journal-bearings 20, in which the driving-shaft 21 is supported and operates, which shaft carries at one end the driving-wheel 22 which may, if desired, be a sprocket-wheel driven by a sprocket-chain 23. At one end the main frame 17 supports, or is formed into, a frame-structure 24 carrying the compression mechanism or cylinder 4, and upon said frame-structure 24 a superstructure 25 is mounted, which carries a cooling cylinder 6. At the opposite end of the main frame 17, the latter supports a frame-structure 26 which carries the expansion chamber 13 and its allied valve mechanism. This general disposition of parts places the driving-shaft 21 transversely and centrally of the frame-structure, gives balance and compactness to the several devices of the apparatus, and brings the several essential mechanisms into intimate relation so as to form a compact and economical arrangement from which all vibration is practically eliminated. This arrangement of parts also places the compression and expansion cylinders substantially in the longitudinal axis of the apparatus and enables them to take the direct thrust of the driving-shaft in and along their longitudinal axes without vibration or strain upon the apparatus or any of its mechanisms. Furthermore, by the arrangement just described, of the several mechanisms of the apparatus, the long runs of pipe forming the conduits for water and gas extend substantially longitudinally of the apparatus, thus preventing what little vibration of the apparatus there may be from being transmitted to the said conduits, and hence avoiding strain upon essential parts and joints of the apparatus. This arrangement of the mechanisms and parts of the apparatus is an important feature of my invention, and upon its advantages and functions, I desire to lay stress.

Generally speaking, the air or other gas, which is employed as the circulating and refrigerating medium, is pumped or forced into the receiving or return chamber or pipe of the compression mechanism by means of the primer-pump located in the bottom of the compression tank, as shown in Figs. 6 and 8, the pump section of the tank being indicated by 27, and the pump cylinder 28 extending longitudinally of said section and secured to the latter by a suitable coupling at one end generally indicated by 29 and forming a part of the stuffing-box for the piston 30, which latter is hollow and operates within the cylinder and carries at its front end the head containing an outlet-valve 31, as usual. The other end of the cylinder is secured to the frame-section 27 by means of the outlet-valve coupling-portion 32 of usual construction, a conduit 33 from which extends to the adjacent head 34 of the compression chamber.

The primer-pump construction forms no part of my invention and, in consequence, is not described nor shown in all its details; but, the piston 30 of said pump is connected to the cross-head or reciprocating driving-frame 35, presently described more in detail, by means of the pivot-bolt 36. By using the primer-pump, the apparatus may be provided primarily, and at all times during its operation, with sufficient air or other gas to insure its successful, constant and automatic operation.

*Compression mechanism.*—The structure of the compression mechanism constitutes one of the important features of my invention and the details thereof will now be described with reference to Figs. 6, 7, 8, 9, 11, 12 and 13. The cylinder of the compressor is indicated by 37 and is preferably made of brass, and is provided at each end with a flange 38, which surrounds the cylinder and affords a bearing for the same within the main frame 4, the latter having corresponding flanges or bearings 39 surrounding the cylinder 37, the frame and cylinder thus forming a water-jacket 40. The periphery of the cylinder 37 is provided with circumferential corrugations or flanges 41, which give to the exterior of said cylinder a greater cooling surface or area. The hollow heads 34 and 42 at the opposite ends of the frame 4 close the latter and the cylinder at both ends, and the head 42 affords a bearing at 43 for the piston 44 carrying the head 45, which operates within the cylinder 37, the opposite head 34 of the frame being provided with a recess 46 for the reception of the outer end of the piston 44, which extends beyond its head 45.

A suitable bushing and stuffing-box construction, generally indicated at 47, surrounds the piston rod at the cylinder head 42 for the usual purposes, and the said piston rod 44 is pivotally connected at 48 with the reciprocating frame 35, and substantially midway of the latter. The cylinder 37 is also provided with a longitudinally extending flange 49, see Fig. 8, located so as to coöperate with an oppositely-disposed flange 50 projecting from the inside of the frame-portion 27, above the primer-pump cylinder, and into the space 40 constituting the water-jacket surrounding the cylinder 37. These two flanges 49 and 50 are so proportioned that they do not engage each other, but stand slightly separated so as to permit the passage of water, and yet constitute a baffle preventing the free flow of water past them and compelling the great volume of water to take passage around the cylinder 37 in the direction of the arrow a, thus providing a means whereby practically the full flow or volume of water will pass around the cylinder and come in contact with substantially every portion of the surface thereof. By this construction, although water is baffled in its free passage around the bottom of the cylinder 37 and is compelled to take the course around and over the top of said cylinder, it may, however, pass to some extent between the two flanges and it will, moreover, accumulate in the chamber afforded by the frame-portion 27 around the primer-pump cylinder 28 and will, in this chamber, form an eddy and receive an agitation sufficient to prevent the water from remaining quiet in said chamber 27 and becoming heated therein. The water, which is the cooling medium for the gas, is, as previously described, taken from any main or tap and pumped to the water-jacket of the compression chamber by means of the pump 2 and enters the said compression chamber through the conduit 3 and the inlet 51 of the frame of the compressor and passes from said water-jacket through the conduit 52 and the conduit 5, and thence passes into the cooling tank 6, as presently described more in detail. The air or gas, returning from the cold room through the conduit 16, see Fig. 1, enters the compression cylinder through the inlet 53, which communicates with the passage 54 extending across the top of the frame 4, which in turn communicates with the chamber 55 of the head 34 and a corresponding chamber in the opposite head 42; or, if the air is supplied by means of the primer-pump shown in Fig. 6, it will be conveyed directly to the chamber 55 of the head 34 by means of the conduit 8, as shown in Fig. 1.

*Inlet valves.*—From the chambers 55, the air passes to the cylinder 37, in front of and behind the piston-head 45, through the inlet-valves generally indicated by 56, in Fig. 9, but shown in detail in Fig. 12, said inlet-valve consisting of the beveled-disk valve-head 57 carried by the stem 58 journaled near the valve-head in the spider 59, which latter is peripherally screw-threaded to coöperate with the inner wall 34$^a$ of the head 34 and is provided at its front end with a beveled flange 60 coöperating with the valve-head 57. At its opposite end the stem 58 is journaled in the cap 61, the inner end of which is hollow and is peripherally screw-threaded to coöperate with the outer wall of the head 34. The said stem 58 operates and is journaled within the recess 62 of the cap 61 and a collar 63 fixed to said stem 58 operates within the hollow of said cap. Surrounding the stem 58 is a coiled-spring 64, one end of which engages the collar 63 and at its other end engages the fixed spider 59, and thus operates to normally and constantly force the valve-head 57 against its seat 60. One of the important features of my invention in this valve mechanism resides in making that portion of the valve-stem, which is journaled in the spider 59, much larger than the rest of the stem and elongating such enlarged portion so as to give to the stem a long, strong, and steady bearing. This is important in that, if the valve-stem should break at or near the head 57, the latter would instantly be projected into the compression chamber with the result of probably breaking or injuring expensive and important parts of the mechanism and of putting the apparatus out of commission; but, by making the bearing for the valve-stem larger, longer and stronger than the remainder of the stem, the possibility of breaking is avoided, the bearing and movement of the stem are made steadier and the certainty of action is materially increased. In order that the air pressure may not force the valve-head 57 too far away from its seat by excessive compression of the spring 64, an additional spring 65 is placed inside the spring 64 and around the stem 58, so as to exert its expansive power upon the stem to prevent excessive movement of valve-head 57, these two springs also having the function of operating as a cushion to prevent the rattling of the valve-parts during the rapid operation of the apparatus and vibration of the valve. Now viewing Fig. 9, it will be seen that the ends of the cylinder 37 project a short distance over the face of the valve-head 57, as shown at 66, thus interposing a stationary part of the frame in the way of the valve-head and so as to operate as a stop and prevent any possibility of said valve-head dropping into the compression cylinder under excessive pressure of the air should the same overcome the strength of the two springs surrounding the valve-stem. Furthermore, it will now be seen that the supplemental spring 65 will also operate as a cushion to prevent the valve-head from being driven with undue force, or with any force, against the projecting portion 66 of the cylinder ends. Hence, though the valve may have absolute freedom of movement for its functional purposes, that movement is limited and the limitation is such as to prevent it from leaving its seat to such an extent as to deprive it, under any circumstances, of its proper operation and functions; and the interposition of the cushioning-spring 65 prevents rattling or noise in the valve mechanism. The compression chamber, as will be readily seen upon reference to Figs. 7 and 9, is provided with the central division-web 67, continued across the heads 34 and 42 by the structure thereof, which separates the inlet and outlet passages 54 and 54$^a$ and produces the corresponding, opposite end-chambers 55 and 55$^a$. The inlet-valves 56 operate to admit the air to the compression cylinder 37, while outlet-valves, generally indicated by 56$^a$ in Fig. 9, allow the air to pass from said cylinder into the chamber 55$^a$ and from thence to the passage 54$^a$ extending across the top of frame 4, to the outlet 70, see Fig. 8, to the conduit 11, see Fig. 1, and to the cooling tank 6.

*Outlet-valves.*—The outlet-valves 56$^a$ are shown in detail in Fig. 11 and, therein, the valve-head 71 is carried by the stem 72 journaled in sleeve 73, in turn journaled at its forward end in the spider 74, which latter is peripherally screw-threaded to coöperate with the ring 75, which in turn is peripherally screw-threaded to coöperate with the wall 34$^a$ of the head 34. The ring 75, at its outer end, is provided with a beveled flange 76 providing a seat for the valve-head 71. The other end of the sleeve 73 is journaled in the cap 77, which is peripherally screw-threaded at its inner end to coöperate with the head 34 and is provided centrally with the bore 78, which latter is enlarged at its open end to provide the chamber 79. The sleeve 73 slides freely in the bore 78 of the cap 77 and near its outer end is provided with the collar or flange 80 affording a bearing for the coiled-spring 81, which surrounds said sleeve, and the other end of which spring operates within the chamber 79, the spring thus exercising a normal tendency to force the sleeve outwardly and the sleeve, in consequence, exercising a normal tendency to force the valve-stem outwardly and the valve-head 71 against its seat 76. In the bore 78 of the cap 77, a coiled-spring 82 is located, which coöperates with the adjacent end of the sleeve 73 and prevents the latter from being forced too far into the bore 78, thus preventing the valve-head 71 from having excessive movement away from its seat 76. In other words, the power of the compressed air will force the valve-head 71 away from its seat 76, thus exerting pressure on the sleeve 73, which in turn will compress the spring 81, the latter having a normal tendency to hold the valve-head 71 against its seat 76; but, should the air pressure be sufficient to excessively compress the spring 81, the spring 82 in the cap 77 will act as a cushion to receive the impact of the end of the sleeve 73, and will prevent too great movement of the valve-head, cushion the movement of the same and prevent the valve parts from rattling or operating upon each other noisily. Viewing Figs. 7, 8 and 9, it will be seen that the inlet and outlet valves are arranged in pairs in the opposite chambers 55 and 55ᵃ, that is, in each of the end-chambers 55, two inlet-valves are provided, one above the other, the pairs of valves admitting gas to the cylinder 37,—alternately in the operation of the apparatus,—in front of and behind the piston-head 45, while in each of the chambers 56ᵃ two outlet-valves are provided permitting the gas to pass from the cylinder 37 from in front of and behind the piston-head 45, the operation and disposition of the valves being the same as described with reference to the inlet-valves.

*Piston-head.*—The air in the cylinder 37 will be compressed by the piston-head generally indicated at 45, as shown in Fig. 6; and the details of construction of this piston-head may be determined upon reference to Fig. 13, wherein the outer end of the piston-rod 44 is provided with an inclined or converging portion 83, terminating in the reduced spindle 84, screw-threaded at its outer end for the reception of the jam and holding nuts 85, which clamp the parts of the piston-head together and the latter firmly upon the end of the piston-rod against the shoulder 86 formed at the juncture of the inclined portion 83 with the body of the piston-rod. The piston-head consists of the two circular parts 87 and 88, the part 87 being provided with the slightly enlarged hub-portion 89. The part 87 is provided in its periphery with the groove 90 beginning substantially midway transversely of said periphery and ending at the inside face of the part 87. The part 88 of the piston-head is provided with a similar peripheral groove 91 terminating laterally of the periphery of said part at the flat face 92, which latter extends to a reduced and elongated portion 93 extending to the inner face of the part 87, to which latter said reduced portion is secured by a plurality of screws 94. The part 88 is also provided with the elongated hub-portion 95 centrally bored for the reception of the spindle-end 84 of the piston-rod and provided with an inclined portion for coöperation with the inclined part 83 of the piston-rod. The two parts 87 and 88, when secured together as described, form between them a peripheral groove in the piston-head for the reception of a piston-ring, which latter consists of a two-part, substantially U-shaped clamp or holder, one part of which is provided with the vertical wall 96 terminating at its outer end in the flange 97, the outer surface of which is grooved so as to correspond in a measure with the wall 92 and groove 91 in the part 88. The body-part 98 of the U-shaped piston-ring extends at a right-angle to the wall 96 and occupies nearly all of the peripheral groove formed in the piston-head. The opposite wall 99 of the piston-ring extends parallel with the wall 96 and is provided with a flange 100, the outer face of which is grooved so as to conform substantially to the groove 90 and inner face of the part 87 of the piston-head. The body-part 98, of the piston-ring, is provided with one or more screw-threaded bores 101, into which an instrument may be inserted for removing the part, which securely holds, in the groove of its periphery, a ring filling in two parts indicated by 102 and 103, said filling having a backing-ring 104 of leather, and under said backing-ring an expansion-band indicated by 105. The ring filling 102 and 103 may be made of rubber, but is preferably made of bronze, the same being a material less liable to corrode or rust under any and all conditions, irrespective of the purpose for which the piston-head is used. On each side of the piston-ring, and between the same and the two parts of the head, a leather packing 107 is inserted, the same consisting of a ring or strip sufficiently wide to enter the groove formed by the two parts of the piston-head in the periphery of the latter and between the same and the piston-ring, the said strips of leather packing being turned over into the groove 90 on the one side and the groove 92 on the other side of the piston-head. This packing 107 is of leather, in case the piston-head is used for cylinders for water or gas compression, or will be of metal, if the piston is used for steam. From this construction, it will be clearly understood that a compact and efficacious piston-head is produced, which can be used in various connections for fluid compression, and that, according to its use, the material of the several parts will be changed, as above indicated, a certain kind of material being used for gas and liquid compression, and another kind of material being used for steam compression.

*Cooling cylinder.*—As previously noted, the water which is used as the cooling medium for the gas, enters the cooling tank 6 through the conduit 5 after passing through the compression cylinder, and in the construction of my invention enters the cooling tank 6 at the bottom thereof through the inlet 108, see Figs. 2 and 14, filling said tank and freely circulating among the air-coils of the cooling tank and passing out of said cooling tank at the top thereof through the passage 109, and from thence through the conduit 7 to the sewer or other waste. The cooling tank shown in its details in Fig. 14 consists of the cylinder 6 having bolted thereto, at one end, a head 110 and at the other end a head 111, each of these heads being convexed so as to give strength and rigidity thereto and, incidentally, so as to enlarge the space in the tank 6. The head 110 is provided centrally with a hub affording a seat 112 for the centrally-disposed, hollow journal or support 113 of a mass of air-coils, presently described, said journal being extended into the screw-threaded shaft 114 passing through an aperture in the seat-hub 112 and having a nut 115 turned thereon to clamp the said journal in place in its seat. The opposite cylinder-head 111 is provided with the centrally-perforated hub 116 for the reception and support of the end of the central pipe 117. The cylinder-head 111, near the bottom of the cylinder, is provided with the inlet 118 for the air or gas, said inlet being formed so as to provide a seat and support for the head 119 of the air-coils or pipes previously referred to. These pipes consist of the outer series of large coils 120, the intermediate, smaller coils 121, and the central coils 122, which are still smaller. These coils are arranged so as to nest one within the other, as shown in Fig. 14, and are preferably held in position and combined for strength and stability by means of clamping and holding bands 123, which partially encircle each coil in a given set, and the parts of which bands are clamped together between coils of each set by bolts 124, each having a head 125 at one end and the washer 126 and nut 127 at the other end, the said head and washer being curved on their inner faces so as to correspond with the curvature of the bands between the coils, which curvature is given to said bands in order that they may partially conform to the periphery of the coils at opposite sides of the latter. By thus binding the coils together in sets, as shown, great strength is added, vibration is eliminated, expansion to a considerable extent is overcome, and a solid and compact structure is produced. At one end, the several coils terminate in the head 119, which forms the general inlet for the passage of gas, and which is seated in the hub 118 of the cylinder head 111, as previously described. At the outer end, the coils terminate in the hollow journal-head 113 resting, as before described, in the central seat 112 of the cylinder-head 110, and which is laterally extended to provide the interiorly screw-threaded portion 128 for connection with the screw-threaded end of the curved central pipe 117 extending centrally and longitudinally of the mass of air-coils. This pipe is given the sinuous form shown, so as to enable the same to expand and contract without creating undue pressure upon, or otherwise injuriously affecting, the two heads of the cylinder, it being obvious that, by giving the said pipe the several bends shown, any expansion or contraction of the metal of the pipe will necessarily exert substantially no power and have substantially no effect upon the said heads of the cylinder 6, the said heads thus not being moved in their relation to the cylinder and there being, in consequence, substantially no strain upon the bolts securing the heads to the cylinder. It will now be obvious that the air, after leaving the compression cylinder, will occupy considerable time in passing through the coils and out of the cooling cylinder, and will be exposed, by reason of the multiplicity of coils, and their disposition, for a long period of time to the cooling effects of the water in the tank. Furthermore, by nesting the several air-coils as described, the latter are given a tremendous radiating surface and enable the water to circulate freely between and around them for the purpose of effectively cooling the air contained in them. The air, after passing through the several coils, enters the central longitudinal pipe 117 and passes from the cooling-tank through the conduit 12 to the expansion cylinder, where it is expanded and cooled for service.

*Expansion chamber.*—The expansion chamber and its allied valve mechanism will be clearly understood upon reference to Figs. 5 and 17 to 24. The frame 26 of the expansion chamber supports the cylinder 13, which has one of its ends 129 bolted thereto and provided with the centrally-recessed hub 130 for the reception of the end of the piston-rod 131, the latter carrying a piston-head 132 constructed in accordance with the piston-head above described and illustrated in Fig. 13. The piston-rod 131 is journaled and slides in the opposite head 133 properly bolted to the cylinder 13, which head has applied to it any common form of stuffing-box generally indicated by 134, which may be found suitable for the purpose of fluidtight packing. The cylinder and heads support the valve-framing, the base plate of which is indicated by 135, having the depending-flange 136 seated on the shoulder 137 of opposite heads 129 and 133. Vertical braces 139, bolted to the base-plate 135 and to the top-plate 140, support the latter in proper position, this framing thus forming a chamber 141, in which the valve mechanism is located and operates. The base-plate, a plan of which is shown in Fig. 24, is provided at one end with opposite guide-lugs 142 and at its other end with opposite guide-lugs 143. Between the guide-lugs 142, and extending transversely of the base-plate, are two valve openings, one of which 144 is narrower than the one 145, and similarly located between the lugs 143 at the opposite end of the base-plate are the similar valve-openings 146 and 147. At one side of the frame 135, a gas-inlet is provided at 148, which communicates with the chamber 141 through the slot 149, while on the opposite side of the frame, a gas-outlet 150 is provided, which communicates through passages 151 and 152, respectively, with the valve openings 145 and 147. The valve-openings 144 and 146 communicate, respectively, with the passages 153 and 154, which enter opposite ends of the cyilnder 13 through the heads 129 and 133, respectively. Within the chamber 141, and coöperating with the passages 144, 145, 146 and 147, is the valve structure clearly shown in Figs. 17 to 23, the same consisting of the reciprocating frame 155, having at opposite ends identical valve-heads 156, and one of which only will now be described, but to each of which the same reference characters will be applied. The body-portion of the valve-head 156, slides upon the bottom of the chamber 141, and is guided at its base between the opposite lugs 142 of the frame 135, said head being provided at its outer end with a plurality of transverse slots 157 extending through the same and each of which converges toward the bottom of the head and also being provided near its rear end, and in its bottom, with the chamber 158. Extending across opposite ends of the slots 157, in the surface of the head 156, are dove-tail grooves in which operates a cut-off slide 159, which is provided with a plurality of transverse slots which may coöperate with the slots 157 extending through the forward end of the valve-head. Pivoted to the center of the reciprocating frame 155, as at 160, is the vibrating lever 161, the opposite ends of which are enlarged so as to produce the driving-head 162, having at its opposite ends the depending flanges 163, which coöperate with the slide 159 for the purpose of reciprocating the latter in the dove-tail grooves of the head 156, so as to cause the said slide 159 to alternately open and close the slots 157 in the forward end of the said head. Secured to one of the guides 142 is a cam-block 164, having at its forward end the enlargement 165 provided with an incline, or cam surface, 166, which coöperates with the adjacent end of the driving head 162, for the purpose of causing the latter to move the slide 159. The cam-block at the opposite end of the valve mechanism is disposed oppositely to the one just described and, in consequence, its cam incline moves the lever 161 in the opposite direction, the two cam-blocks, in consequence, having the function of moving the two valve-slides 159 alternately in opposite directions, thus causing the latter to open and close the passages or slots 157 at the opposite ends alternately.

For the purpose of securing the proper coöperation of the cam-blocks 163 with the opposite ends of the lever 161, the bolts 167, which secure said blocks in place, can be loosened and the adjusting-screw 168 set so as to bring the cam inclines 165 in proper relation to the coöperating ends of the respective driving-heads 162. In order that the frame 155 may be reciprocated between the pairs of guides 142 and 143, said frame is provided on opposite sides of the central pivot 160 with the vertically extending lugs 169 grooved for the purpose of receiving and having slide therein the flanged blocks 170, each of which is provided with a socket for the reception of the ball end 171 of the depending crank-arm 172, said socket, at its top, being open and flared as at 173 to permit the proper movement of the said crank-arm 172, which latter is secured to a sleeve 174 splined upon the end of a shaft 175, journaled at one end by a reduced part 176 in the dome portion 177 of the top-frame 140, said shaft 175 being, at its opposite end, journaled in the opposite end of the overhanging portion 178 of said top-frame, 140. Proper bushings surround the shaft 175 and are supported in the overhanging portion 178 of the top-frame 140, as clearly shown in Figs. 18 and 19, details of said bushings not being herein set forth, as they form no part of my present invention. The outer end of the shaft 175 is reduced as indicated at 179, and has keyed thereon the crank-arm 180 provided with the crank-pin 181, through the medium of which rocking motion is imparted to the shaft 175, as will be presently described, in order to rock the crank-arms 172 and reciprocate the slide-frame 155, and at the same time cause the vibration of the lever 161 through the coöperation of the driving-heads 162 with the cam-blocks 164. By reason of the ball and the socket connection between the crank-arms 172 and the slide-blocks 170, ease of motion between the sliding-frame and its driving mechanism is permitted and binding of the parts prevented.

As shown in Figs. 10 and 18, the frame of the expansion cylinder, at all the points where it is connected to the main frame, is insulated from the latter by heat non-conducting material 182, said material surrounding the bolts 183, securing the frame parts together, and separating the said frame parts, as clearly shown. The insulation of the expansion-cylinder frame from the main frame portions, as just described, is highly essential, as the main frame parts become, during the operation of the apparatus, very much heated and it is important that the heat shall not be transmitted to the expansion cylinder or its supporting-frame, for the reason that the air should go to the cold room 15 through the conduit 14 with as low a temperature as possible. Therefore, the arrangement shown and described of insulating material is maintained throughout all the connections of the frame 8 to the main frame and other frame portions.

*Driving mechanism.*—Referring now to Figs. 2, 3, 4, 5, 6, 10, 18 and 19, it will be seen that the driving-shaft 21 is provided with an eccentric 184 surrounded by a strap, the rod 185 of which is connected to the crank-pin 181 carried by the arm 180 of the rock-shaft 175. On the outer end of the driving-shaft 21, adjacent the eccentric 184, is secured the driving-pulley or sprocket wheel 186, which drives the chain or belt 187, which, in turn, drives the belt-pulley or sprocket-wheel 189 secured to the shaft of the water-circulating pump 2. The driving-shaft 21 has substantially centrally thereof the driving-crank 190, which may be formed thereon in any usual manner, and which carries the two-part slide-box 191, Fig. 10, which in turn coöperates with the frame 35 which slides between the guide-bars 192 secured to the top and bottom of the frame. Thus, the frame 35 has reciprocating motion imparted to it by direct thrust from the main shaft and imparts its movements to the pistons 30 and 44 of the primer pump and compression cylinder, respectively, as previously described, and also to the piston 131 of the expansion cylinder, which is pivoted to said frame at 193. As previously described, the driving-wheel 22, which may be band or sprocket, is driven by the electric motor 19 through the medium of the belt or sprocket chain 23, which derives its movement from the sprocket-wheel or belt-pulley 194 carried by shaft 195 of the motor. The usual electric connections 196 may be conventionally indicated as shown in Fig. 2, and which will extend to any generator conveniently located. The motor thus disposed on the top of the main frame and between the compression and cooling cylinders on the one hand, and the expansion cylinder on the other, and directly over the driving-shaft and in close relation to the driving-wheel, produces a compact construction wherein there will be practically no vibration on account of the perfect balance of the apparatus, and wherein all the driving mechanism is compactly and centrally disposed and the driving-rods, pistons and parts are given their movements by direct and positive thrusts from a centrally disposed driving-shaft, the power of which is directly applied. This particular arrangement of the several apparatus or mechanisms is a very important part of my invention, and upon it I desire to lay stress.

To aid in steadying the operation of the machine at high speed, brace-bars 197 are disposed at opposite sides of the frame and on opposite sides of the pillow-blocks or journal-bearings 20, as shown in Figs. 4 and 5, said brace-bars being bolted to the base of the pillow-blocks, as at 198, and at their opposite ends to the several frame-structures of the apparatus, as at 199.

*Operation.*—Having described the details of my invention, as I now contemplate the same, the following mode of operation will be readily understood upon reference to the drawings; but, it should be primarily borne in mind that atmospheric air or other gas can be used as the medium for producing refrigeration or making ice, as the case may be, and that water is the medium used for cooling the gas or for the purpose of extracting heat from the latter at the points where such operation is most necessary in the apparatus. Electric current being supplied from any suitable source, the same will be translated to the motor, which latter will be caused to rotate and drive the main shaft 21 of the apparatus through the belt or sprocket-chain 23 and the belt or sprocket-wheel 22. Rotation of the driving-shaft 21 will cause the frame 35 to reciprocate in its guide-ways and reciprocate the several pistons 30, 44 and 131, thus bringing into operation the primer-pump, the compression cylinder and the expansion cylinder. At the same time, the driving-pulley or sprocket-wheel 186, through the medium of the belt or chain 187, will actuate the water-circulating pump 2, and the eccentric 184, pitman 185 and crank-arm 180 will rock the shaft 175, thus operating the valve mechanism of the expansion chamber. The apparatus may now be considered to be in operation with gas being supplied through the medium of the primer-pump to the compression cylinder and water supplied by the pump 2. The air entering the chamber 55 of the compression cylinder, on one side or the other, will force its way through the inlet-valves 56 to the cylinder 37 and into coöperation with the piston-head 45, the movement of which latter will permit the air to enter said cylinder 37 in sufficient volume on one side and simultaneously compress and drive it out on the other side, the compression chamber thus being double acting.

Viewing Figs. 6 and 9, and assuming the piston to be moving to the right, the air behind the piston-head will be compressed until its pressure opens the outlet-valves 56ª, thus permitting the air to escape into chamber 55ª, from whence it will pass through passage 54ª and to and through outlet 70 into conduit 11 and thence to the cooling chamber. The forward movement of the piston-head will compress the air in cylinder 37 until its pressure opens the opposite outlet-valves to allow it to escape into chamber 55ª at the opposite end from whence it will pass to the cooling chamber as before stated. As compression of air takes place at one end of the cylinder 37, the other end thereof is being filled by air entering through the inlet-valves 56 from the chamber 55, passage 54 and inlet 53 from either the primer-pump or the conduit 16, or both. On entering the cooling cylinder 6 at the inlet 119, the gas will pass into the three sets of nested coils and circulate through the latter, eventually entering the sinuous pipe 117, and finally leaving said cooling cylinder at 116 and passing along the conduit 12 to the expansion cylinder, will enter the latter through the valve-chamber 141, which is supplied by the inlet 148 and passage 149. Reaching the valve-chamber 141, and with the valve mechanism reciprocating as previously described, and assuming the piston and valve to be moving in direction of arrow c, Fig. 17, the cut-off slide 159, at the right-hand end, will now be open, and the one at the left-hand end will be closed, the air, in consequence, as the portion 156ª of the valve-head crosses the upper end of passage 144, and opening the latter, entering the passages 157, in the right-hand valve-head 156, and passing through the passages 144 and 153 into the cylinder 13. As this occurs, the portion 156ª of the valve-head at the left-hand end will cross the top of passage 146, thus opening a free way for the escape of the expanded air in the cylinder 13 on the left of piston-head 132, said air passing, under pressure from the piston, through passages 154, 146, chamber 158, passages 147, 152 and outlet 150, to the conduit 14, and thence to service or the cold room. As the piston and valve mechanism return in the direction opposite that of arrow c, the cut-off slide 159, of the left-hand head 156, will have opened the passages 157 of said head by previous coöperation of the adjacent cam-block, the same action having closed the like passages in the right-hand valve-head; hence, as the portion 156ª of said left-hand valve-head recrosses the top of passage 146, the air in chamber 141 will rush through passages 157, 146, and 154 into cylinder 13 behind piston-head 132. A reverse action is taking place at the right-hand end as the passages 153, 144, chamber 158, and passages 145 and 151 to outlet 150 are opened to permit the escape of the expanded air in front of the piston-head 132. Thus, for each movement of the piston and valve mechanism, air is expanded and passed to service, the expansion mechanism being, in consequence, double acting and coöperative with the double acting compression mechanism so as to keep up the efficiency and capacity of the apparatus which, obviously, are double that of ordinary apparatus of like character. Leaving the cold room, the gas will pass through the conduit 16 to the compression cylinder, entering the same as before explained and circulating through the apparatus as described, the gas being, in consequence, alternately compressed and expanded so as to properly perform its work and, after compression, being cooled and passed to the expansion chamber, where its temperature is reduced, for its work in the cold room. In order to facilitate the cooling of the gas, the circulating pump 2 is used to pump water from the conduit 1 to the conduit 3 into the compression cylinder, entering the latter at 51 and passing in greater volume around and over the top of the compression cylinder and finding its outlet at 52 into the conduit 5, passing from thence into the cooling cylinder at the bottom thereof at the inlet 108, where it will freely circulate among the air-coils, thus extracting the heat from the gas in said coils. Passing from the cooling cylinder at the outlet 109, the water will pass through the conduit 7 to the sewer or other waste pipe. If desired, the flow of gas to the expansion chamber can be regulated by the valve 200, which may be of any usual construction.

From the above detail description of the apparatus and the mode of operation of the latter as just set forth, it will be obvious that the following, in addition to those already incidentally set forth, are among the advantages of my invention: a compact, comparatively inexpensive, highly effective, powerful and large capacity apparatus is produced; by arranging the motor as described with reference to the driving-shaft of the apparatus and distributing the compression cooling and expansion mechanisms as set forth, a well balanced apparatus is produced which, during its operation, will be substantially without vibration or jar and will be light and smooth running; by constructing the compression chamber as described, overheating is prevented and the heat generated is quickly and effectively extracted from the cylinder by the water circulating around the body thereof, and by arranging the baffle at the bottom of the compression chamber, the great volume of water admitted to the water chamber 40 is caused to pass entirely around the compression cylinder 37 and contact with every portion thereof, and at the same time is not permitted to collect in a still body in the lower frame-portion 27 wherein is situated the cylinder of the primer-pump, the latter, in consequence, being kept cool by reason of the agitation of the water in the chamber 27, all this being accomplished by the interposition of the baffles 49 and 50; by constructing the inlet and outlet valves of the compression mechanism as described, they are compelled to operate with absolute certainty and perform their functions effectively without excessive movement and without noise, irrespective of the speed of the apparatus; the valve mechanism is simple in construction, positive in its operation, effective in its action and capable of sustaining high speed without losing any of its effectiveness or positiveness in operation; by combining the reciprocating frame 35 with the driving-shaft as described, and coupling the several pistons therewith, as shown, the driving-shaft and the driving-frame are enabled, by direct thrust, to impart to the several piston-rods positive and direct movements with absolutely no drag or twisting strains upon either the several pistons, or the said frame and shaft, and the arrangement of parts shown and described produces a distribution of power and motion in suchwise as to minimize vibration in the apparatus, irrespective of the speed of the latter; and, by the compact arrangement of the several devices or mechanisms of the apparatus and the balanced disposition thereof, the single driving-shaft is enabled to operate directly and positively all the various elements or mechanisms constituting the apparatus.

Having thus described my invention, what I claim and desire to secure by Letters Patent is:

1. A refrigerating apparatus having in combination a supporting frame; a driving-shaft extending transversely of said frame in the middle thereof; a motor carried by the frame directly above the driving-shaft and centrally of said frame; driving connections between the motor and the driving-shaft extending down beside said frame; an expansion cylinder at one end of the frame arranged longitudinally thereof; a compression cylinder and a cooling cylinder at the other end of the frame arranged one above the other and at a right angle to each other; a piston working in the expansion cylinder; a piston working in the compression cylinder; and direct connections between said pistons and the driving-shaft.

2. A refrigerating apparatus having in combination a main frame; a driving-shaft mounted thereon; an electric motor mounted on the frame above the shaft; actuating connections between the motor and the shaft; a compression cylinder; an expansion cylinder; a primer-pump arranged alongside of the compression cylinder; a water circulating pump, all mounted on the said frame; a sliding-frame; individual connections between the sliding-frame and the said cylinders and pumps; means for actuating said frame from the driving-shaft; and connections between the several mechanisms for continuously circulating gas therethrough.

In testimony whereof I have hereunto signed my name in the presence of two subscribing witnesses.

GEORGE H. REYNOLDS.

Witnesses:
FLORENCE ATEN IVES,
CHAS. McC. CHAPMAN.